United States Patent Office 3,795,731
Patented Mar. 5, 1974

3,795,731
PROCESS FOR THE COMBUSTION OF
AMMONIUM SULFATE
Herbert Furkert, Grosskonigsdorf, Germany, assignor to
Chemiebau Dr. A. Zieren GmbH & Co. KG, Cologne,
Germany
No Drawing. Filed Feb. 22, 1972, Ser. No. 228,258
Claims priority, application Germany, Feb. 19, 1971,
P 21 07 910.7
Int. Cl. C01b 21/02, 17/50, 5/00
U.S. Cl. 423—351                                18 Claims

ABSTRACT OF THE DISCLOSURE

A process for converting particulate ammonium sulfate into a decomposition product consisting essentially of sulfur dioxide, steam, and molecular nitrogen substantially free of nitrogen oxides, comprising:

(a) burning a carbonaceous fuel in a combustion chamber in the presence of sufficient combustion air to maintain an oxygen concentration of from 1 to 10% by volume in gases exiting from the combustion chamber;
(b) feeding a stream of particulate ammonium sulfate having a particle size of from 0.01 to 1.0 mm. diameter into said combustion chamber; and
(c) burning said ammonium sulfate in said combustion chamber at a temperature of from 800 to 1250° C. to form a decomposition product consisting essentially of sulfur dioxide, steam, and molecular nitrogen substantially free of nitrogen oxides.

BACKGROUND OF THE INVENTION

Field of the invention

This invention relates to a process for the combustion of particulate ammonium sulfate to sulfur dioxide, steam, and nitrogen.

Description of the prior art

A number of commercial scale chemical processes, such as various methods for the production of caprolactam, result in the output of large amounts of ammonium sulfate $(NH_4)_2SO_4$, a byproduct for which there is very little demand. Accordingly, the prior art has described various methods of converting ammonium sulfate into more valuable chemicals.

German Published Application 1,229,995 [1] describes one such process wherein ammonia is split off from ammonium sulfate at 350–400° C., and the thus-obtained ammonium bisulfate is then decomposed by reduction at about 400–550° C. into sulfur dioxide and ammonium sulfate. This process is valuable in permitting the recovery of ammonia and thus is suitable in cases where it is desired to recycle the ammonia into the preceding process, but the process does not entirely convert the ammonium sulfate into commercially valuable products.

U.S. Pat. 3,359,069 and German Pats. 1,199,243 and 1,206,404 describe the thermal decomposition of a waste liquor comprising sulfuric acid containing ammonium salts such as ammonium sulfate at temperatures of above 900° C. In this process, the ammonium ion dissolved in the acid is essentially converted to nitrogen and water, so that an $SO_2$-containing gas is produced which is practically free of nitrogen oxide. This process is suitable, for example, for the combustion of waste liquors such as the residual sulfuric acids obtained in the manufacture of acrylates which contain organic as well as inorganic ammonium salts.

[1] Corresponding to U.S. Pat. 3,383,170.

Since this method involves the oxidation of trivalent nitrogen to elemental nitrogen with simultaneous reduction of hexavalent sulfur in $H_2SO_4$ to tetravalent sulfur in $SO_2$, it is highly suitable for treating waste liquors containing sulfur acids and ammonium salts. However, there are many chemical processes wherein ammonium sulfate is obtained as a byproduct in the absence of these sulfur acids and in which it would be desirable to convert ammonium sulfate into commercially valuable products.

In the process of U.S. Pat. 3,359,069 the excess of sulfuric acid present in the liquid to be burnt guarantees that in the combustion chamber no ammonia can pass into the vapor phase and escape with the product gas without being oxidized. However, when feeding a stream of ammonium sulfate which is substantially devoid of sulfuric acid into the combustion chamber the salt passes necessarily into the critical temperature range in which ammonia is split off. Thus it was not obvious to get this ammonia oxidized and to obtain a $SO_2$-containing gas free of ammonia.

SUMMARY OF THE INVENTION

Accordingly, it is an object of this invention to provide a process for converting particulate ammonium sulfate into sulfur dioxide, steam, and nitrogen.

Another object of this invention is to provide a process for the combustion of particulate ammonium sulfate to products substantially free of nitrogen oxides.

A further object of this invention is to provide a process for uniformly feeding particulate ammonium sulfate into a combustion chamber, whereby rapid and complete combustion thereof is facilitated.

An additional object of this invention is to provide a process for efficiently oxidizing trivalent nitrogen in solid state ammonium sulfate.

Briefly, these and other objects of this invention are attained in one aspect by a process for converting particulate ammonium sulfate into a decomposition product consisting essentially of sulfur dioxide, steam, and molecular nitrogen substantially free of nitrogen oxides, comprising (a) burning a carbonaceous fuel in a combustion chamber in the presence of sufficient combustion air to maintain an oxygen concentration of from 1 to 10% by volume in gases exiting from the combustion chamber;
(b) feeding a stream of particulate ammonium sulfate having a particulate size of from 0.01 to 1.0 mm. diameter into said combustion chamber; and
(c) burning said ammonium sulfate in said combustion chamber at a temperature of from 800 to 1250° C. to form a decomposition product consisting essentially of sulfur dioxide, steam, and molecular nitrogen substantially free of nitrogen oxides.

It has now been found that ammonium sulfate is decomposed into sulfur dioxide, steam, and nitrogen when particulate, finely divided ammonium sulfate is burned at temperatures of between 800 and 1250° C., together with a carbonaceous fuel, while maintaining an oxygen concentration of between 1 and 10% by volume in the gases exiting from the combustion chamber, corresponding to from 1.07 to 3.0 times the stoichiometric amount of oxygen required for complete fuel combustion within the combustion chamber. Under these conditions, the ammonium sulfate, or the ammonia and ammonium bisulfate which may have been formed as intermediates, burns completely to sulfur dioxide, steam, and nitrogen, substantially free, i.e., containing less than 40 p.p.m., of nitrogen oxides. Suitable carbonaceous fuels include those in which hydrogen is combined with carbon, e.g., natural gas, fuel oil, oil refinery byproduct gas, methane as well as carbon monoxide.

The thus-formed combustion gas can be further processed in a suitable known manner, for example, by contact catalysis into sulfuric acid or oleum.

In accordance with a preferred embodiment of this invention, ammonium sulfate is ground to an average particle size of between 0.01 and 1.0 mm., preferably between 0.01 and 0.5 mm., and especially between 0.02 and 0.2 mm. average diameter. By average particle size as used herein is meant a particle size, such that 90% will pass through a screen of this size.

Such a fine comminution makes it possible to feed ammonium sulfate uniformly into the combustion chamber and also to effect rapid combustion of the individual sulfate particles. The use of particles smaller than about 0.01 mm. diameter results in handling difficulties, while the use of particles larger than about 1.0 mm. in diameter leads to incomplete combustion at temperatures suitable for decomposing ammonium sulfate without the formation of nitrogen oxides or ammonia.

The ammonium sulfate is preferably burned at a temperature of between 950 and 1150° C. In this temperature range, combustion proceeds in such a manner that neither ammonia nor nitrogen oxides occur in the combustion gas in a pronounced quantity, i.e., generally less than 200 p.p.m. ammonia, and less than 40 p.p.m. nitrogen oxides are produced. Preferably, an $O_2$ concentration of between 2 and 5% by volume is maintained in the gases discharged from the combustion chamber, corresponding to from 1.07 to 3.0 times the stoichiometric amount of oxygen required for complete fuel combustion within the combustion chamber.

Typically, combustion chamber residence times for the particulate ammonium sulfate range from 0.3 to 15 sec., preferably from 0.4 to 2.5 sec.

In a preferred embodiment of this invention, particulate ammonium sulfate is blown into the combustion chamber by means of a carrier gas stream, such as air, nitrogen, fuel gases, natural gas or carbon monoxide.

In using a cylindrical combustion chamber, for example, the ammonium sulfate is preferably injected axially from an end face, whereas the burners are arranged in the cylindrical shell and oriented radially or tangentially into the combustion chamber. Feeding a particulate ammonium sulfate stream by blowing is likewise possible from the ceiling in an upright combustion furnace, and from an end face in case of a horizontal furnace. It is, of course, also possible to orient the ammonium sulfate feed point and the burners in some other mutual relationship, the only requirement for finite operability being that the particulate ammonium sulfate stream enters into the combustion zone of the furnace.

Preferably, the ammonium sulfate is blown into the combustion chamber of a standard size furnace with a carrier gas comprising about 0.1–0.5 Nm.$^3$ (Nm.$^3$ is a standard abbreviation for 1 cubic meter at 0° C. at 1 atmosphere absolute) of a carrier gas such as air per kg. of ammonium sulfate. This ratio ensures a uniform feed of the sulfate into the combustion zone without allowing an unnecessarily large amount of air to enter into the combustion chamber as the carrier gas. The air actually utilized for combustion is introduced separately at the burners. In order to precisely guide the ammonium sulfate particle stream into the combustion zone, it is preferred to feed the finely divided ammonium sulfate to the flame through a lance extending into the combustion chamber. The lance is a straight pipe consisting of quartz or stainless steel. It extends through an opening provided in the furnace ceiling and is connected to a fan by means of a pipe line which has attached thereto a dosing apparatus for the ammonium sulfate. The lance can be introduced into the combustion chamber to a varying extent corresponding to its scattering range, so that the entire combustion zone is charged uniformly with ammonium sulfate. It is advantageous to cool the lance in order to prevent the premature splitting off or ammonia, such as by air or a cooling liquid which is circulated around the lance outside the furnace.

The air jet for conveying particulate ammonium sulfate into the combustion zone can be preheated to improve thermal efficiency as well as to render the feed of sulfate uniform; however, a sufficient temperature differential must be maintained with respect to the decomposition temperature range of the ammonium sulfate. In general, the stream of conveying air will preferably be preheated to a temperature of not more than 200° C., preferably in the range of 50 to 150° C.

According to a preferred embodiment of the invention, sulfur is simultaneously burned in the combustion chamber. In this embodiment, the $SO_2$ content of the combustion gas is increased thereby compensating for sulfur losses elsewhere. A fuel oil rich in sulfur is advantageously employed as the carbonaceous fuel, in order to obtain a combustion gas having an $SO_2$ content sufficient for subsequent contact catalysis. Other sulfur-containing waste products, such as, for example, byproduct sulfuric acids containing organic compounds and/or ammonium compounds of the type disclosed in U.S. Pat. 3,359,069, can also be burned simultaneously.

A plant for conducting the process of this invention is exemplified by a main combustion chamber and an adjoining afterburning combustion chamber. Both combustion chambers are generally cylindrical and are disposed vertically and in communication with each other at their lower ends. The gaseous stream of particulate ammonium sulfate passes from the upper portion of the main combustion chamber in a downward direction, from the lower portion of this chamber through the connection duct into the afterburning chamber, and therein again in the upward direction. A portion of the combustion air, e.g., from 0 to 20% by volume of total combustion air feed, can be fed directly into the afterburning chamber.

Other known types of furnaces are likewise usable for conducting the process of the present invention; for example, the ammonium sulfate combustion can be effected in a single combustion chamber having a horizontal axis.

The ammonium sulfate need not be blown into the chamber in the axial direction, but can also be fed tangentially. It is also possible to introduce the sulfate without the aid of a carrier gas; feeding, for example, via suitable gravity tubes leading from the ceiling of a vertically disposed furnace into the combustion zone, is possible so long as uniform charging of the combustion zone is ensured. The ammonium sulfate can be fed to the gravity tubes by means of suitable metering devices, for example, bucket wheels.

The feeding of the ammonium sulfate into the optionally preheated carrier gas stream can be metered in any known manner, for example, with the aid of a screw, bucket wheel, or similar adjustable metering mechanisms.

Without further elaboration, it is believed that one skilled in the art can, using the preceding description, utilize the present invention to its fullest extent. The following preferred specific embodiment is, therefore, to be construed as merely illustrative, and not limitative of the remainder of the disclosure in any way whatsoever.

EXAMPLE

About 1972 kg./h. of sulfur, and about 226 kg./h. of fuel oil are burned in a furnace maintained at 1050° C. by the combustion of heavy grade fuel oil. The combustion air for the fuel oil is preheated to about 500° C. The combustion of the fuel oil takes place with 1.84 times the theoretical stoichiometric ratio of air. Ammonium sulfate ground to a particle size of below 0.1 mm. diameter is fed with the aid of a conveyor screw into the carrier air stream in metered amounts of 2.5 kg. per Nm$^3$ of conveying air.

The combustion gas at a temperature of about 1040° C. is passed through a waste heat boiler wherein steam at a pressure of 55 atmospheres gauge is produced. The combustion gas is then further cooled, mixed with air, and dried. About 5850 Nm³ of a dry gas is obtained containing about 5.9% by volume of $SO_2$, 4.0% by volume of $CO_2$, 8.8% by volume of $O_2$, and 81.3% by volume of $N_2$. Total nitrogen oxides were 28 p.p.m. This gas can be processed to sulfuric acid in a conventional manner to produce about 1500 kg. of $H_2SO_4$ per hour.

The preceding example can be repeated with similar success by substituting the generically or specifically described reactants and/or operating conditions of this invention for those used in the preceding example.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for converting particulate ammonium sulfate into a decomposition product consisting essentially of sulfur dioxide, steam, and molecular nitrogen substantially free of nitrogen oxides, comprising:
   (a) burning a carbonaceous fuel in a combustion chamber in the presence of sufficient combustion air to maintain an oxygen concentration of from 1 to 10% by volume in gases exiting from the combustion chamber;
   (b) feeding in a continuous and uniform manner a stream of particulate ammonium sulfate having a particle size of from 0.01 to 1.0 mm. diameter into said combustion chamber, said stream being substantially devoid of sulfuric acid; and
   (c) burning said ammonium sulfate in said combustion chamber at a temperature of from 800 to 1250° C. to form a decomposition product consisting essentially of sulfur dioxide, steam, and molecular nitrogen, said decomposition product being substantially free of nitrogen oxides and ammonia.

2. A process according to claim 1, wherein said particle size is from 0.01 to 0.5 mm. diameter.

3. A process according to claim 1, wherein said particle size is from 0.02 to 0.2 mm. diameter.

4. A process according to claim 1, wherein said temperature is from 950 to 1150° C.

5. A process according to claim 1, wherein said oxygen concentration is maintained from 2 to 5% by volume.

6. A process according to claim 1, wherein said carbonaceous fuel is selected from the group consisting of fuel oil, natural gas, oil refinery byproduct gas, methane and carbon monoxide.

7. A process according to claim 1, wherein said particulate ammonium sulfate is blown into the combustion chamber by means of a carrier gas stream.

8. A process according to claim 7, wherein the carrier gas is preheated to a temperature of less than 200° C.

9. A process according to claim 7, wherein said particulate ammonium sulfate is blown into the combustion chamber with 0.1–0.5 Nm³ of carrier gas per kg. of ammonium sulfate.

10. A process according to claim 9, wherein said carrier gas is air.

11. A process according to claim 1, further comprising simultaneously burning sulfur in the combustion chamber.

12. A process according to claim 1, wherein said particulate ammonium sulfate is fed directly into a flame in the combustion chamber, and is suddenly exposed to the temperature in the chamber, thereby avoiding premature splitting-off of ammonia.

13. A process according to claim 1 wherein said particulate ammonium sulfate is solid ammonium sulfate.

14. A process according to claim 13 wherein the combustion chamber residence time for the particulate ammonium sulfate is 0.3–15 seconds.

15. A process according to claim 14, wherein said particulate ammonium sulfate is fed directly into a flame in the combustion chamber, and is suddenly exposed to the temperature in the chamber, thereby avoiding premature splitting-off of ammonia.

16. A process according to claim 1 wherein said carbonaceous fuel is a hydrocarbon or carbon monoxide.

17. A process according to claim 1 wherein the combustion chamber residence time for the particulate ammonium sulfate is 0.3–15 seconds.

18. A process according to claim 1 wherein the combustion chamber residence time for the particulate ammonium sulfate is 0.4–2.5 seconds.

References Cited
UNITED STATES PATENTS

| | | | |
|---|---|---|---|
| 3,359,069 | 12/1967 | Furkert et al. | 423—541 X |
| 3,645,683 | 2/1972 | Isbell | 423—540 |
| 3,383,170 | 5/1968 | Furkert et al. | 423—541 X |
| 3,282,646 | 11/1966 | Bonfield et al. | 423—541 |

OSCAR R. VERTIZ, Primary Examiner

J. COOPER, Assistant Examiner

U.S. Cl. X.R.

423—541, 580